United States Patent
Colli et al.

(10) Patent No.: US 12,478,630 B2
(45) Date of Patent: Nov. 25, 2025

(54) METHOD FOR TREATING ENDOMETRIOSIS AND PROVIDING EFFECTIVE CONTRACEPTION

(71) Applicant: CHEMO RESEARCH, S.L., Madrid (ES)

(72) Inventors: Enrico Colli, Madrid (ES); Salustiano Pérez, Madrid (ES)

(73) Assignee: CHEMO RESEARCH, S.L., Madrid (ES)

( * ) Notice: Subject to any disclaimer, the term of this patent is extended or adjusted under 35 U.S.C. 154(b) by 0 days.

(21) Appl. No.: 18/911,121

(22) Filed: Oct. 9, 2024

(65) Prior Publication Data

US 2025/0108061 A1    Apr. 3, 2025

Related U.S. Application Data

(63) Continuation of application No. 18/682,824, filed as application No. PCT/EP2022/072511 on Aug. 11, 2022.

(30) Foreign Application Priority Data

Aug. 12, 2021   (EP) .................................... 21382757

(51) Int. Cl.
  *A61K 31/585*   (2006.01)
  *A61K 9/20*   (2006.01)

(52) U.S. Cl.
  CPC .......... *A61K 31/585* (2013.01); *A61K 9/2009* (2013.01); *A61K 9/2013* (2013.01); *A61K 9/2018* (2013.01); *A61K 9/2054* (2013.01)

(58) Field of Classification Search
  CPC .. A61K 31/585; A61K 9/2009; A61K 9/2013; A61K 9/2018; A61K 9/2054
  See application file for complete search history.

(56) References Cited

U.S. PATENT DOCUMENTS

| | | | |
|---|---|---|---|
| 10,849,857 B2 | 12/2020 | Perrin et al. | |
| 2019/0167700 A1* | 6/2019 | Jost | ..................... A61K 31/565 |

FOREIGN PATENT DOCUMENTS

| | | |
|---|---|---|
| JP | 2018083806 A | 5/2018 |
| WO | 9913882 A1 | 3/1999 |

OTHER PUBLICATIONS https://elsevier.health/en-US/preview/reproductive-health/drospirenone, (Year: 2025).*
Breivik et al., "Assessment of pain," British Journal of Anaesthesia 101(1):17-24, 2008. (8 pages).

(Continued)

*Primary Examiner* — Carlos A Azpuru
(74) *Attorney, Agent, or Firm* — Seed Intellectual Property Law Group LLP

(57) ABSTRACT

The present invention relates to drospirenone for use in a method for treating endometriosis, endometriosis associated pelvic pain (EAPP) and/or dysmenorrhea, comprising administering drospirenone in a biphasic regimen. The present invention furthermore relates to the use of drospirenone administered in such a biphasic regimen as a contraceptive and for inducing amenorrhea, as well as to a pharmaceutical composition and a kit comprising drospirenone administered in such a biphasic regimen.

13 Claims, 2 Drawing Sheets

(56) References Cited

OTHER PUBLICATIONS

Casper, "Progestin-only pills may be a better first-line treatment for endometriosis than combined estrogen-progestin contraceptive pills," *Fertility and Sterility* 107(3):533-536, Mar. 2017. (4 pages).
Côté et al., "Work Loss Associated With Increased Menstrual Loss in The United States," *Obstetrics & Gynecology* 100(4):683-687, Oct. 2002. (5 pages).
Den Tonkelaar et al., "Preferred Frequency and Characteristics of Menstrual Bleeding in Relation to Reproductive Status, Oral Contraceptive Use, and Hormone Replacement Therapy Use," *Contraception* 59:357-362, Jun. 1999. (6 pages).
Edelman et al., "Continuous or extended cycle vs. cyclic use of combined hormonal contraceptives for contraception (Review)," *Cochrane Database of Systematic* 7(Cd004695):1-65, 2023. (71 pages).
Gerlinger et al., "Defining a minimal clinically important difference for endometriosis-associated pelvic pain measured on a visual analog scale: analyses of two placebo-controlled, randomized trials," *Health and Quality of Life Outcomes* 8(138):1-7, 2010. (7 pages).
Glasier et al., "Amenorrhea associated with contraception—an international study on acceptability," *Contraception* 67:1-8, 2003. (8 pages).
Kimble et al., "A 1-year prospective, open-label, single-arm, multicenter, phase 3 trial of the contraceptive efficacy and safety of the oral progestin-only pill drospirenone 4 mg using a 24/4-day regimen," *Contraception X* 2(100020):1-8, 2020. (8 pages).
Laboratorios León Farma S.A., "Open-Label, Randomized Study to Evaluate the Influence on the Hormonal and Ovarian Activity of Two Different Dosages of Drospirenone (either 4.0 mg for 24 Days or 2.8 mg Daily for 28 Days) Over Two Treatment Cycles in 50 Healthy, Young Females," EU Clinical Trials Register, EudraCT No. 2011-004085-15, Sep. 2011. (6 pages).
Loudon et al., "Acceptability of an oral contraceptive that reduces the frequency of menstruation: the tri-cycle pill regimen," *British Medical Journal* 2:487-490, Aug. 1977. (4 pages).
Norwitz et al., "Obstetrics and Gynecology at a Glance: Fourth Edition," Wiley-Blackwell, pp. 1-15, 2013. (17 pages).
Palacios et al., "Bleeding profile of women using a drospirenone-only pill 4 mg over nine cycles in comparison with desogestrel 0.075 mg," *PLOS One* 15(6):e0231856, Jun. 2020. (14 pages).
Palacios et al., "Efficacy and cardiovascular safety of the new estrogen-free contraceptive pill containing 4 mg drospirenone alone in a 24/4 regime," *BMC Women's Health* 20(218):1-9, 2020. (9 pages).
Palacios et al., "Metabolic and laboratory effects of a progestin-only pill containing drospirenone 4 mg in comparison to desogestrel 75 µg: a double-blind, double-dummy, prospective, randomised study," *The European Journal of Contraception & Reproductive Health Care* 26(6):454-461, Aug. 2021. (9 pages).
Palacios et al., "Multicenter, phase III trials on the contraceptive efficacy, tolerability and safety of a new drospirenone-only pill," *Acta Obstet Gynecol Scand* 00:1-9, 2019. (9 pages).
Palacios et al., "Oestrogen-free oral contraception with 4 mg drospirenone-only pill: new data and a review of the literature," *The European Journal of Contraception & Reproductive Health Care* 25(3):221-227, Apr. 2020. (8 pages).
Rose et al., "Young Women's Attitudes Toward Continuous Use of Oral Contraceptives: The Effect of Priming Positive Attitudes Toward Menstruation on Women's Willingness to Suppress Menstruation," *Health Care for Women International* 29:688-701, 2008. (15 pages).
Rutter et al., "Women's attitudes to withdrawal bleeding and their knowledge and beliefs about the oral contraceptive pill," *The Medical Journal of Australia* 149:417-419, Oct. 1988. (3 pages).
Schindler, "Dienogest in long-term treatment of endometriosis," *International Journal of Women's Health* 3:175-184, 2011. (10 pages).
Szarewski et al., "Women's attitudes towards monthly bleeding: results of a global population-based survey," *The European Journal of Contraception and Reproductive Health Care* 17:270-283, Aug. 2012. (14 pages).
Taylor et al., "Treatment of Endometriosis-Associated Pain with Elagolix, an Oral GnRH Antagonist," *New England Journal of Medicine* 377(1):28-40, Jul. 2017. (13 pages).
Vercellini et al., "Endometriosis: pathogenesis and treatment," *Nat. Rev. Endocrinol.* 10:261-275, May 2014. (15 pages).
Vercellini et al., "Medical treatment of endometriosis related pain," *Best Practice & Research Clinical Obstetrics and Gynaecology*, pp. 1-24, 2018. (24 pages).
Vercellini et al., "Norethindrone acetate or dienogest for the treatment of symptomatic endometriosis: a before and after study," *Fertility and Sterility*, p. 1-10, 2015. (13 pages).
Wiegratz et al., "Attitude of German women and gynecologists towards long-cycle treatment with oral contraceptives," *Contraception* 69(1): 37-42, 2004. (6 pages).
Zondervan et al., "Endometriosis," *New England Journal of Medicine* 382(13):1244-1256, Mar. 2020. (13 pages).

\* cited by examiner

METHOD FOR TREATING ENDOMETRIOSIS AND PROVIDING EFFECTIVE CONTRACEPTION

FIELD OF THE INVENTION

The present invention pertains to the field of women's health and more specifically the treatment of endometriosis, endometriosis associated pelvic pain and/or dysmenorrhea. The present invention therefore relates to drospirenone for use in a method for treating endometriosis, endometriosis associated pelvic pain (EAPP) and/or dysmenorrhea, comprising administering drospirenone in a biphasic regimen. The present invention furthermore relates to the use of drospirenone administered in such a biphasic regimen as a contraceptive and for inducing amenorrhea, as well as to a pharmaceutical composition and a kit comprising drospirenone administered in such a biphasic regimen.

BACKGROUND OF THE INVENTION

Endometriosis is a chronic, estrogen-dependent disease characterized by the presence of endometrial tissue outside the uterus including the ovaries and other pelvic structures. These lesions cause a chronic, inflammatory reaction, which can lead to the generation of scar tissue and adhesions. Women with endometriosis frequently experience symptoms of dysmenorrhea, premenstrual pain, dyspareunia and chronic fatigue, (Schindler, 2011) as well as the less common symptoms of pain at ovulation, constipation, and painful urination (Taylor et al., 2017). In addition, the presence of ectopic endometrium can also cause infertility, which can be the case in up to 50% of women with endometriosis (Vercellini et al., 2014). Women with endometriosis are therefore confronted with one or both of the two major problems: endometriosis-associated pain and infertility. The severity of symptoms does not necessarily correlate with the degree of pelvic disease or the size of the lesions. Many women with minimal endometriosis complain of severe pelvic pain (Norwitz E. R and Schorge J. O. 2013).

Endometriosis is estimated to affect 10% of reproductive-age women, which extrapolates to approximately 190 million women worldwide.

Currently there is no cure for endometriosis. Women with endometriosis still require ongoing, collaborative, supportive management of their condition, as well as an understanding of the significant impact that the condition can have on their quality of life. The main aims of treatment are to alleviate pain and other symptoms, reduce endometriotic lesions, and improve the quality of life of affected individuals.

Current hormonal treatments for endometriosis associated pain focus on systemic or local estrogen suppression, inhibition of tissue proliferation and inflammation, or both. Combined oral contraceptives (COCs) are widely used as the first-line treatment for dysmenorrhea or chronic pelvic pain with or without presumed endometriosis, particularly in adolescents with endometriosis (Vercellini and Buggio 2018). Nevertheless, estrogens do have a stimulatory effect on the metabolic activity of the endometrial mucosa. Thus, COCs administration could result in an estrogen dominance, with the potential risk of lesion progression (Casper 2017).

Progestin-only treatment is also used as the first-line therapy for pelvic pain associated with endometriosis and for suppressing the extent of endometriotic lesions. One FDA approved progestin for the treatment of endometriosis, secondary amenorrhea, and abnormal uterine bleeding is norethisterone acetate (NETA) (5 mg tablets). Whilst in principle NETA can also provide ovulation inhibition starting from a dosage of 0.35 mg/daily when given continuously over 28 days, it is not approved for contraceptive use, since the high dosage needed for the treatment of endometriosis (5-15 mg/daily) is more than 10 times higher than the dosage necessary for ovulation inhibition (0.35 mg/daily). Therapy may be held at this high dosage level for a maximum of six to nine months, or until breakthrough bleeding demands temporary termination of the treatment. Furthermore, at such high dosages NETA can produce androgenic side effects, such as acne, hirsutism, weight gain and voice changes of slight severity in some women.

Another approved progestin, Dienogest (DNG), is a synthetic progestin that is currently used for clinical treatment of endometriosis in Europe with a dose of 2 mg daily (Visanne® 2 mg tablets). DNG, being devoid of androgenic activity, is better tolerated than NETA. DNG 2 mg daily provides ovulation inhibition, but ovarian activity is not completely suppressed, thus it has not been approved as a contraceptive (Caruso, 2019). Therefore, users are formally invited to adopt barrier contraception or other non-hormonal alternatives (Vercellini, 2016) when using DNG in the treatment of endometriosis.

Currently approved treatments for endometriosis associated pain have no indication for contraception. Moreover, the concomitant use of hormonal contraceptives with some FDA or European-approved drugs for endometriosis (e.g., GnRH antagonists such as the recently approved product Elagolix or progestins as dienogest) is not permitted. The need for the use of barrier contraception may limit compliance for these products and could increase the discontinuation rate. Thus, there is a definitive need for therapies treating endometriosis associated pelvic pain (EAPP) in women seeking hormonal contraception.

Drospirenone (DRSP) is a derivative of spironolactone which has progestomimetic, antimineralocorticoid and anti-androgenic activity. Drospirenone as a contraceptive ingredient is available in oral combined pills such as those marketed under the name of Yasmin® (3 mg DRSP/30 µg ethinyl estradiol), Yaz® (3 mg DRSP/20 µg ethinyl estradiol) and Yasminelle® (3 mg DRSP/20 µg ethinyl estradiol). These pills comprise ethinyl estradiol which acts to increase the ovulation inhibitory effect of drospirenone and to ensure contraception and cycle control.

In the EU and USA, DRSP has been recently approved as a POP for contraception in women of reproductive age (Slinda™/Slynd™). The approved posology is one white active tablet (DRSP 4 mg) daily during the first 24 days and one green inactive tablet daily during the 4 following days. DRSP POP formulations may be prepared by the methods described in the prior art, for example, described in WO 2012/00981 A or WO 2016/207298 A. The rationale behind the DRSP 24/4 regimen, including 4 hormone-free days in each cycle, was the creation of a progestogen-only method, offering predictable scheduled bleedings, otherwise not associated with progestogen-only contraception (Slinda Public Assessment Report, Swedish MPA template version, 2019).

The avoidance or absence of menstruation, called "amenorrhea", achieved through continuous dosing regimens has features which can be desirable from the patient perspective, including improved adherence to treatment regimen, reduced interference with daily life and special events and less menstruation-related absenteeism from work or school (Côté et al., 2002; Rose et al., 2008; Edelman et al., 2014). Historical data from patient surveys and opinions from participants in clinical studies of hormonal contraceptives suggest that a significant proportion of women prefer the reduction in the frequency of menstruation or amenorrhea associated with a continuous dosing regimen (Loudon et al., 1977; Rutter et al., 1988; den Tonkelaar et al., 1999; Glasier et al., 2003; Wiegratz et al., 2004; Ferrero et al., 2006). In a large survey of over 4,000 women of reproductive age in North America, South America and Europe, 60% of respondents expressed a desire to postpone menstrual bleeding (Szarewski et al., 2012). Thus, there is also a need to provide a contraceptive which ensures high contraceptive safety and reliability and at the same time reduces inter-menstrual bleeding (menses), i.e. induces amenorrhea.

Two phase III trials in sexually active women for up to thirteen 28-day treatment cycles evaluated the contraceptive effectiveness and safety of oral DRSP 4 mg 24/4-day regimen in the United States and Europe (Palacios, 2019 and Kimble et al. 2020). In general, after 9-13 cycles of the use of oral DRSP 4 mg 24/4-day regimen approximately 40% of the users reported amenorrhoea. However, there is still a need to provide for a more rapid and efficient manner of inducing amenorrhea in which more women can benefit from less or no bleeding after fewer cycles of using oral DRSP.

In a Phase II study (Study report CF111/203, 2014), two different dosing regimens were evaluated for two cycles: a continuous regimen with DRSP 2.8 mg dose for 28 days compared with the currently approved 24+4 dosing regimen with DRSP 4.0 mg (Slynd™) to assess the ovulation inhibition potential reflected by the hormonal and ovarian activity of the two regimens in 50 healthy women. Although the results of this study have been published (EudraCT number: 2011-004085-15), the trial disclosure provides no details regarding the bleeding pattern of the women.

SUMMARY OF THE INVENTION

The present invention therefore relates in one aspect to drospirenone for use in a method for treating endometriosis, endometriosis associated pelvic pain (EAPP) and/or dysmenorrhea in a female subject, comprising administering drospirenone in a biphasic regimen to said subject, wherein during the first phase a daily amount of drospirenone is administered and in the second phase a lower daily amount of drospirenone is administered.

In one embodiment of the method of the present invention said daily amount of drospirenone is administered once daily from day 1 to day 24 and subsequently said lower daily amount of drospirenone is administered once daily on days 25 to 28.

In one embodiment of the method of the present invention the daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In a further embodiment of the method of the present invention, the lower daily amount of drospirenone administered from day 25 to 28 is from about 2.5 mg to 3.5 mg, preferably from about 2.6 mg to 3.2 mg, more preferred about 3.0 mg, most preferred about 2.8 mg of drospirenone.

In a preferred embodiment of the method of the present invention the daily amount of drospirenone administered from day 1 to day 24 is 4.0 mg and the lower daily amount of drospirenone administered from day 25 to 28 is 2.8 mg.

In a further preferred embodiment of the method of the present invention said method for treating endometriosis, endometriosis associated pelvic pain (EAPP) and/or dysmenorrhea also provides contraception.

In one embodiment of the method of the present invention an estrogen is not administered.

The present invention relates in a further aspect to drospirenone for use in a method for providing contraception to a female subject, comprising administering to said subject drospirenone in a biphasic regimen, wherein during the first phase a daily amount of drospirenone is administered and in the second phase a lower daily amount of drospirenone is administered.

In one preferred embodiment of this method, said administering of drospirenone induces amenorrhea. In an even more preferred embodiment of this method, said administering of drospirenone induces amenorrhea in more than 25%, preferably more than 30% of the female subjects after two administration cycles.

In one preferred embodiment of this method, said administering of drospirenone induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects after three or even after two administration cycles.

In an even more preferred embodiment, said administering of drospirenone induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects already after one administration cycle.

In another preferred embodiment of this method, said administering of drospirenone induces amenorrhea in at least 30%, at least 31%, at least 32%, at least 33%, at least 34%, at least 35%, at least 36%, at least 37%, at least 38%, at least 39%, preferably in at least 40%, at least 41%, at least 42%, at least 43%, at least 44%, at least 45%, at least 46%, at least 47%, at least 48%, at least 49%, at least 50% of the subjects after six administration cycles.

In one embodiment of this method said daily amount of drospirenone is administered once daily from day 1 to day 24 and subsequently a lower daily amount of drospirenone is administered once daily on days 25 to 28.

In a further embodiment the daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In a further embodiment the lower daily amount of drospirenone administered from day 25 to 28 is from about 2.5 mg to about 3.5 mg, preferably from about 2.6 mg to about 3.2 mg, more preferred about 3.0 mg, most preferred about 2.8 mg of drospirenone.

In a further embodiment the present invention relates to the use of drospirenone as a contraceptive in a female subject, comprising administering drospirenone in a biphasic regimen to said subject, wherein during the first phase a daily amount of drospirenone is administered and in the second phase a lower daily amount of drospirenone is administered.

In yet a further embodiment said use of drospirenone induces amenorrhea. In a more preferred embodiment said use of drospirenone induces amenorrhea in at least 20%, preferably in at least 25%, most preferred in at least 30% of the female subjects after four, preferably after three, most preferred after two administration cycles.

In one preferred embodiment said use of drospirenone induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects after three or even after two administration cycles.

In an even more preferred embodiment said use of drospirenone induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects already after one administration cycle.

In one preferred embodiment said use of drospirenone induces amenorrhea in at least 30%, at least 31%, at least 32%, at least 33%, at least 34%, at least 35%, at least 36%, at least 37%, at least 38%, at least 39%, preferably in at least 40%, at least 41%, at least 42%, at least 43%, at least 44%, at least 45%, at least 46%, at least 47%, at least 48%, at least 49%, at least 50% of the subjects after six administration cycles.

In one embodiment of the use of drospirenone of the present invention said daily amount of drospirenone is administered once daily from day 1 to day 24 and subsequently said lower daily amount of drospirenone is administered once daily on days 25 to 28.

In a further embodiment of said use the daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In yet a further embodiment of said use the lower daily amount of drospirenone administered from day 25 to 28 is from about 2.5 mg to about 3.5 mg, preferably from about 2.6 mg to about 3.2 mg, more preferred about 3.0 mg, most preferred about 2.8 mg of drospirenone.

In a preferred embodiment of said use the daily amount of drospirenone administered from day 1 to day 24 is about 4.0 mg and the lower daily amount of drospirenone administered from day 25 to 28 is about 2.8 mg.

In one embodiment of the use of the present invention an estrogen is not administered.

In one embodiment of the method for treating endometriosis, endometriosis associated pelvic pain (EAPP) and/or dysmenorrhea and the use of drospirenone as a contraceptive of the present invention the administration route is selected from oral, transdermal or transmucosal administration, preferably the administration route is oral.

The present invention furthermore relates to a kit, preferably a contraceptive kit, comprising one or more packaging units, wherein each packaging unit comprises at least 28 active daily dosage units, wherein
  a) at least 24 daily dosage units comprise a first amount of drospirenone, wherein each of these daily dosage units comprise the same amount of drospirenone, and the amount is higher than the amount of drospirenone in the daily dosage units of a second amount of drospirenone; and
  b) at least 4 daily dosage units comprise the second amount of drospirenone, wherein each of these daily dosage units comprise the same amount of drospirenone, and the amount of drospirenone is lower than in the daily dosage units comprising the first amount of drospirenone.

In one embodiment of the kit of the present invention the at least 28 active daily dosage units do not comprise an estrogen.

In a preferred embodiment of the present invention drospirenone is the only contraceptive active ingredient in the at least 28 active daily dosage units.

In one embodiment of the kit of the present invention, said first amount of drospirenone is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In a further embodiment of the kit of the present invention, said second amount of drospirenone is from about 2.5 mg to about 3.5 mg, preferably from about 2.6 mg to about 3.2 mg, more preferred about 3.0 mg, most preferred about 2.8 mg.

In a preferred embodiment of the kit of the present invention said first amount of drospirenone is about 4.0 mg and said second amount of drospirenone is about 2.8 mg.

The present invention furthermore relates to a pharmaceutical composition comprising drospirenone for use in a method for treating endometriosis, endometriosis associated pelvic pain (EAPP) and/or dysmenorrhea as described herein above, wherein the pharmaceutical composition further comprises one or more pharmaceutically acceptable excipients.

In one embodiment of the pharmaceutical composition of the present invention said pharmaceutically acceptable excipients are at least one binder and at least one filler, and wherein:
  (i) the amount of drospirenone accounts for 1% to 10% by weight
  (ii) the amount of the at least one binder accounts for 50% to 65% by weight and
  (iii) the amount of the at least one filler accounts for 25% to 35% by weight,
the percentages by weight being related to the total weight of the said pharmaceutical composition.

In a further embodiment of the present invention, the pharmaceutical composition further comprises at least one glidant and at least one lubricant wherein:
  (iv) the amount of the at least one glidant accounts for 0.2% to 6% by weight
  (v) the amount of the at least one lubricant accounts for 0.2% to 0.6% by weight the percentages by weight being related to the total weight of the said pharmaceutical composition.

In a preferred embodiment of the pharmaceutical composition of the present invention
(i) the at least one binder is microcrystalline cellulose,
(ii) the at least one filler is anhydrous lactose,
(iii) the at least one glidant is silicon dioxide, and
(iv) the at least one lubricant is magnesium stearate.

The present invention furthermore relates to the use of drospirenone as defined herein above as a contraceptive in a pharmaceutical composition as defined herein above.

The present invention furthermore relates to a method of treatment of endometriosis, endometriosis associated pelvic pain (EAPP) and/or dysmenorrhea in a female subject in need thereof, comprising administering to a female subject drospirenone in a biphasic regimen, wherein during the first phase a daily amount of drospirenone is administered and in the second phase a lower daily amount of drospirenone is administered.

In one embodiment of said method of treatment of endometriosis, endometriosis associated pelvic pain (EAPP) and/or dysmenorrhea the daily amount of drospirenone is administered once daily from day 1 to day 24 and subsequently said lower daily amount of drospirenone is administered once daily on days 25 to 28.

In one embodiment of said method of treatment of endometriosis, endometriosis associated pelvic pain (EAPP) and/or dysmenorrhea the daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In a further embodiment of said method of treatment of endometriosis, endometriosis associated pelvic pain (EAPP) and/or dysmenorrhea the lower daily amount of drospirenone administered from day 25 to 28 is from about 2.5 mg to about 3.5 mg, preferably from about 2.6 mg to about 3.2 mg, more preferred about 3.0 mg, most preferred about 2.8 mg of drospirenone.

In a preferred embodiment of said method of treatment of endometriosis, endometriosis associated pelvic pain (EAPP) and/or dysmenorrhea the daily amount of drospirenone administered from day 1 to day 24 is about 4.0 mg and the lower daily amount of drospirenone administered from day 25 to 28 is about 2.8 mg.

In a further embodiment of the method for treating endometriosis, endometriosis associated pelvic pain (EAPP) and/or dysmenorrhea also provides contraception.

In a further embodiment of the method for treating endometriosis, endometriosis associated pelvic pain (EAPP) and/or dysmenorrhea an estrogen is not administered.

Embodiments of the present invention furthermore relate to a method for providing contraception to a female subject in need thereof, comprising administering to said female subject drospirenone in a biphasic regimen, wherein during the first phase a daily amount of drospirenone is administered and in the second phase a lower daily amount of drospirenone is administered.

In one embodiment of said method for providing contraception said daily amount of drospirenone is administered once daily from day 1 to day 24 and subsequently said lower daily amount of drospirenone is administered once daily on days 25 to 28.

In one embodiment of said method for providing contraception the daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In a further embodiment of said method for providing contraception the lower daily amount of drospirenone administered from day 25 to 28 is from about 2.5 mg to about 3.5 mg, preferably from about 2.6 mg to about 3.2 mg, more preferred about 3.0 mg, most preferred about 2.8 mg of drospirenone.

In a preferred embodiment of said method for providing contraception the daily amount of drospirenone administered from day 1 to day 24 is about 4.0 mg and the lower daily amount of drospirenone administered from day 25 to 28 is about 2.8 mg.

In a further embodiment of the method for providing contraception estrogen is not administered.

The present invention furthermore relates to a method for inducing amenorrhea in a female subject, comprising administering drospirenone in a biphasic regimen to said female subject, wherein during the first phase a daily amount of drospirenone is administered and in the second phase a lower daily amount of drospirenone is administered.

In one embodiment of said method said daily amount of drospirenone is administered once daily from day 1 to day 24 and subsequently a lower daily amount of drospirenone is administered once daily on days 25 to 28.

In one embodiment of said method said daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In one embodiment of said method said lower daily amount of drospirenone administered from day 25 to 28 is from about 2.5 mg to about 3.5 mg, preferably from about 2.6 mg to about 3.2 mg, more preferred about 3.0 mg, most preferred about 2.8 mg of drospirenone.

In a further embodiment of said method the administration route is selected from oral, transdermal or transmucosal administration, preferably the administration route is oral.

The present invention also relates in one aspect to drospirenone for use in a method for treating endometriosis, endometriosis associated pelvic pain (EAPP) and/or dysmenorrhea in a female subject in need thereof, comprising administering drospirenone in a continuous regimen to said female subject, wherein drospirenone is administered once daily from day 1 to day 28 in an amount from about 2.5 mg to 3.5 mg, more preferred about 3.0 mg, most preferred about 2.8 mg of drospirenone.

In yet a further preferred embodiment said method for treating endometriosis, endometriosis associated pelvic pain (EAPP) and/or dysmenorrhea also induces amenorrhea.

In a more preferred embodiment said method induces amenorrhea in at least 20%, preferably in at least 25%, most preferred in at least 30% of the female subjects after four, preferably after three, most preferred after two administration cycles.

In one preferred embodiment said method induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects after three or even after two administration cycles.

In an even more preferred embodiment, said method induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects already after one administration cycle.

In one preferred embodiment said method induces amenorrhea in at least 30%, at least 31%, at least 32%, at least 33%, at least 34%, at least 35%, at least 36%, at least 37%, at least 38%, at least 39%, preferably in at least 40%, at least 41%, at least 42%, at least 43%, at least 44%, at least 45%, at least 46%, at least 47%, at least 48%, at least 49%, at least 50% of the subjects after six administration cycles.

DETAILED DESCRIPTION OF THE INVENTION

Definitions

Figure 1:
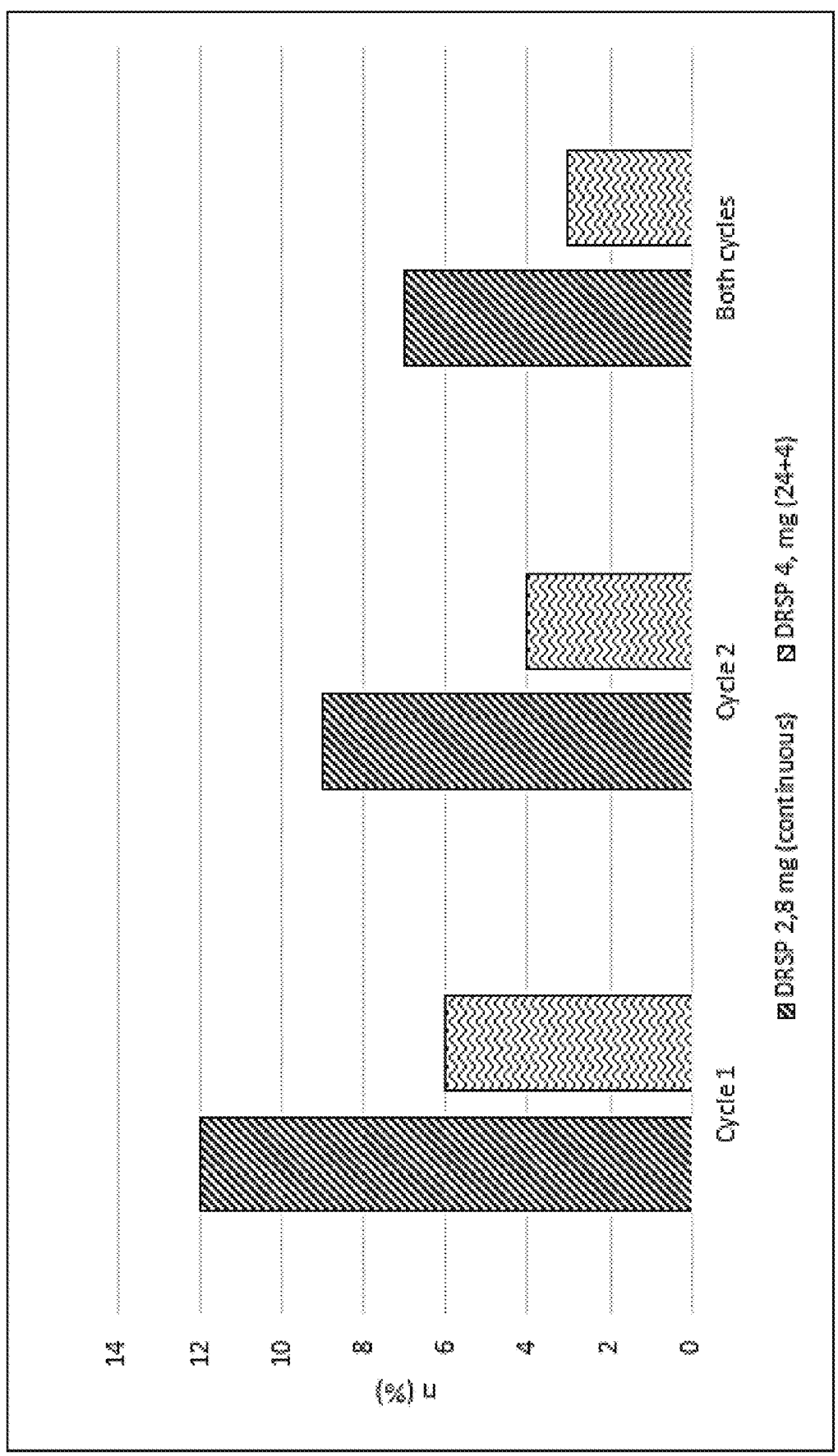
FIG. 1 shows the number of subjects with amenorrhea by cycle (FAS) observed in DRSP 2.8 mg continuous treatment compared to DRSP 4.0 mg (24+4 treatment) as further detailed in Example 1 and table 1.
Figure 2:
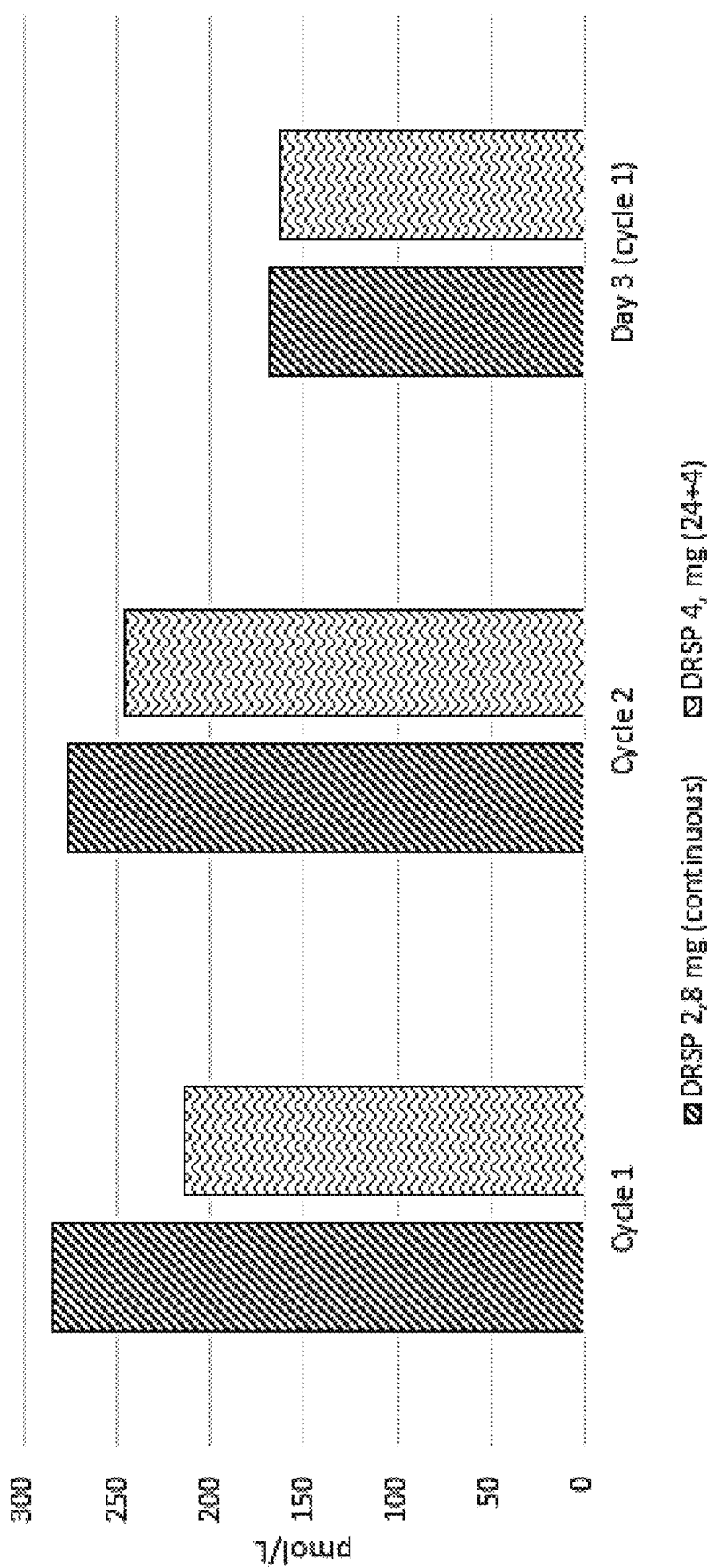
FIG. 2 shows serum levels of estradiol (pmol/L) obtained for DRSP 2.8 mg continuous treatment compared with DRSP 4.0 mg (24+4) as further detailed in Example 1 and table 2.

As used herein, the term "active daily dosage unit" or "daily dosage unit" refers to physically discrete units suitable as unitary dosage which can be administered to a subject to provide the required amount of active ingredient, such as drospirenone.

As used herein the term "amenorrhea" refers to the absence/lack of bleeding/spotting during at least 28 days or one administration cycle in a female subject, preferably a woman of reproductive age.

As used herein the term "biphasic" or "biphasic regimen" refers to a dosage regimen with two phases, in which the amount of active ingredient administered in the first phase is different from the amount of active ingredient administered in the second phase. The active ingredient administered in each phase is constant, i.e. the active ingredient is present in the same amount in each daily dosage form administered during each phase. In each phase active ingredient is administered with each daily dosage form, i.e. the daily dosage form cannot contain no active ingredient.

As used herein, the term "contraceptive kit" refers to a kit that is serving to prevent pregnancy when administered according to the instructions and in a daily effective amount to a female patient.

As used herein a "contraceptive method" relates to a method for preventing pregnancy.

As used herein, the term "drospirenone" refers to drospirenone itself, i.e. the chemical entity identified by the CAS registry Number 67392-87-4, solvates of drospirenone, and derivates or prodrugs of drospirenone. Drospirenone may be prepared by well-known methods described in the prior art, for example, described in U.S. Pat. No. 4,129,564, WO9806738, EP11746101 or WO2006061309. The method described in WO2006061309 may be particularly suitable for preparing drospirenone.

As used herein the term "dysmenorrhea" refers to the medical term for painful menstrual periods which are caused by uterine contractions. Primary dysmenorrhea refers to recurrent pain, while secondary dysmenorrhea results from reproductive system disorders.

As used herein the term "endometriosis" and "endometriosis associated pelvic pain (EAPP)" refer to a chronic, estrogen-dependent disease that is characterized by the formation of endometriotic lesions outside the uterus including the ovaries and other pelvic structures and one of its most common symptoms which is reported as pelvic pain, respectively. All subtypes of endometriosis, including superficial, cystic, deep infiltrating, abdominal wall and catametial endometriosis are included. The efficacy of the management of Endometriosis associated pelvic pain (EAPP) can be assessed using different rating scales, such as the visual analogue scale (VAS) or the numeric rating scale (NRS), as well known to the skilled person (see for example Gerlinger et al. (2010) and Breivik et al. (2008)). Depending on the rating scale for example already a difference of at least 1.0, at least 1.1, at least 1.2, at least 1.3, at least 1.4, at least 1.5, at least 1.6, at least 1.7, at least 1.8, at least 1.9, at least 2, at least 2.1, at least 2.2, at least 2.3, at least 2.4, at least 2.5, at least 2.6, at least 2.7, at least 2.8, at least 2.9, at least 3.0 on a 0-10 NRS scale to placebo can be regarded as clinically meaningful and as providing a real benefit to the patient.

As used herein, the term "estrogen" defines a group of steroid hormones which promote the development and maintenance of female characteristics of the body. Synthetic estrogens are well-known and commonly used in oral contraceptives or to treat menopausal and menstrual disorders.

As used herein with respect to the dosage form of the invention, the term "oral", "oral dosage form", "oral pharmaceutical dosage form", "oral administration", "oral compositions" "oral pharmaceutical compositions", "oral contraceptive compositions", "oral tablets", "oral capsules", "orally ingested", "orally", "oral route" and the like all refer to any method of administration through the mouth. The oral dosage form of the invention is usually ingested intact, although it may be ingested tampered (e.g., crushed) and usually with the aid of water or a beverage to hasten passage through the mouth.

As used herein "progestogen-only contraceptive", or "progestogen-only pill" (also known as "POP") means a pill or a contraceptive which comprises progestogens as sole contraceptive active ingredients and does not comprise any estrogen.

As used herein a "therapeutically effective amount" refers to an amount effective, at dosages and for periods of time necessary to achieve the desired therapeutic result, such as one or more of the following therapeutic results, such as a significant delay of the onset or progression of the disease; or a significant reduction of the severity of one or more symptoms. A therapeutically effective amount is also typically one in which any toxic or detrimental effect of the active ingredient or pharmaceutical composition is outweighed by the therapeutically beneficial effects.

As used herein, "treatment", "treating" or "treat" refer to: (i) preventing or retarding a disease, disorder or condition from occurring in a subject which may be predisposed to the disease, disorder and/or condition but has not yet been diagnosed as having it; (ii) inhibiting the disease, disorder or condition, i.e., arresting or slowing down its development or progression; and/or (iii) relieving the disease, disorder or condition, i.e., causing regression of the disease, disorder and/or condition. In certain embodiments, such term refers to the amelioration or eradication of a disease or symptoms associated with a disease.

Methods of the Present Invention

The present invention relates to drospirenone for use in a method for treating endometriosis, endometriosis associated pelvic pain (EAPP) and/or dysmenorrhea in a female subject comprising administering drospirenone in a biphasic regimen to said subject, wherein during the first phase a daily amount of drospirenone is administered and in the second phase a lower daily amount of drospirenone is administered.

The so far approved dosing regimen of drospirenone is a 24+4 regime, meaning that on 24 consecutive days drospirenone is administered, whereas days 25-28 are used for a hormone break in which a placebo is administered. The present invention envisages a different kind of 24+4 regimen. Instead of administering a daily amount of drospirenone for the first 24 days and then a placebo, it is proposed by present inventors to use a biphasic schedule which involves administering an amount of drospirenone once daily from day 1 to day 24 and subsequently a lower daily amount of drospirenone once daily on days 25 to 28. The daily amount of drospirenone administered from day 1 to day 24 is from about 2.0 mg to 6.0 mg, preferably from about 3.0 mg to 5.0 mg, more preferred from about 3.5 mg to 4.5 mg, most preferred about 4.0 mg of drospirenone. The lower daily amount of drospirenone administered from day 25 to 28 is from about 2.5 mg to about 3.5 mg, preferably from about 2.6 mg to about 3.2 mg, more preferred about 3.0 mg, most preferred about 2.8 mg of drospirenone. In the most preferred embodiment, the daily amount of drospirenone administered from day 1 to day 24 is 4.0 mg and the lower daily amount of drospirenone administered from day 25 to 28 is 2.8 mg.

In a preferred embodiment of the method of the present invention said method for treating endometriosis, endometriosis associated pelvic pain (EAPP) and/or dysmenorrhea also provides reliable contraception throughout the administration cycle. As described above Progestogen-only Pills (POPs) have the advantage of avoiding the combined administration of estrogens as compared to traditional contraceptive combined pills. It is therefore one aim of the present invention to achieve treatment of endometriosis, endometriosis associated pelvic pain (EAPP) and/or dysmenorrhea in a female subject in need thereof and at the same time provide a reliable contraception by administering only one daily dosage form. Preferably, this dosage form shall not contain any estrogen which, whilst being beneficial for the contraceptive effect, can be detrimental for the treatment of estrogen induced endometriosis.

For endometriosis treatment an extended regimen with hormone free interval every 6 months or one year may be preferred.

In a further aspect, the present invention also relates to drospirenone administered to a female subject in need thereof as described herein above for use in the treatment of one or more of the following diseases or disorders in a female subject: dyspareunia, premenstrual pain, myomas, adenomyosis uteri, uterine fibrosis, uterine leiomyoma or endometrial polyps.

Uses

The present invention furthermore relates to the use of drospirenone as a contraceptive for a female subject in need thereof, comprising administering drospirenone in a biphasic regimen to said subject, wherein during the first phase a daily amount of drospirenone is administered and in the second phase a lower daily amount of drospirenone is administered.

As is already described above for the methods of the present invention a different kind of 24+4 regimen than proposed in the prior art is envisaged. Instead of administering one amount of drospirenone for the first 24 days and then a placebo, it is proposed by present inventors to administer a daily amount of drospirenone once daily from day 1 to day 24 and subsequently a lower daily amount of drospirenone once daily on days 25 to 28. The daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone. The lower daily amount of drospirenone administered from day 25 to 28 is from about 2.5 mg to 3.5 mg, preferably from about 2.6 mg to 3.2 mg, more preferred about 3.0 mg, most preferred about 2.8 mg of drospirenone. In the most preferred embodiment, the daily amount of drospirenone administered from day 1 to day 24 is 4.0 mg and the lower daily amount of drospirenone administered from day 25 to 28 is 2.8 mg.

In the Phase II study CF111/203, summarized in Example 1, two different dosing regimens were evaluated for two cycles: a continuous regimen with DRSP 2.8 mg dose for 28 days compared with the currently approved 24+4 dosing regimen with DRSP 4.0 mg (Slynd™). The yet unpublished study results surprisingly showed that the DRSP 2.8 mg continuous regime induced amenorrhea in a higher proportion of subjects in both cycles. Seven (28.0%) subjects compared to three (12.0%) DRSP 4.0 mg group subjects. In Cycle 1, twelve (48.0%) DRSP 2.8 mg subjects and six (24.0%) DRSP 4.0 mg subjects reported amenorrhea. In Cycle 2, nine (36.0%) DRSP 2.8 mg subjects and four (16.0%) DRSP 4.0 mg subjects were amenorrhoeic (see Example 1, Table 1).

In summary, the proportion of amenorrheic subjects in the DRSP 2.8 mg group was higher in comparison with the DRSP 4.0 mg group in both treatment cycles. As described above clinical studies of hormonal contraceptives suggest that a significant proportion of women prefer the reduction in the frequency of menstruation or amenorrhea associated with a continuous dosing regimen. The continuous regimen of drospirenone given at a daily dose of 2.8 mg thus showed to be a useful alternative to address the specific need of women to control the bleeding pattern and achieve the desired amenorrhea.

Drospirenone is a progestin that acts by blocking the production of gonadotropin-releasing hormone, which in turn causes reduction in gonadotropins and reduced estrogen production. Phase II study CF111/203 showed that compared to the subjects on the DRSP 2.8 mg continuous regimen, the subjects on the DRSP 4.0 mg 2+4 regimen tended to have lower mean and median serum estradiol levels per subject. The difference between the groups was not statistically significant. Furthermore, both treatments had no clinically meaningful impact in decreasing estradiol levels (see example 1). A careful balance has to be kept between too low estrogen levels leading to unwanted side effects such as for example osteoporosis, and too high levels of estrogen being detrimental to estrogen dependent diseases, such as endometriosis. It is therefore one further aim of the present invention to provide the benefit of amenorrhea maintaining estrogen balance whilst providing at the same time a reliable contraceptive effect.

In one embodiment of the present invention the use of drospirenone as a contraceptive as described herein above induces amenorrhea. In a more preferred embodiment said use of drospirenone induces amenorrhea in at least 20%, preferably in at least 25%, most preferred in at least 30% of the subjects after four, preferably after three, most preferred after two administration cycles.

In one preferred embodiment said use of drospirenone induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects after three or even after two administration cycles.

In an even more preferred embodiment said use of drospirenone induces amenorrhea in at least 20%, at least 21%, at least 22%, at least 23%, at least 24%, at least 25%, at least 26%, at least 27%, at least 28%, at least 29%, preferably in at least 30%, at least 31%, at least 32%, at least 33%, at least 34%, at least 35%, at least 36%, at least 37%, at least 38%, at least 39%, more preferably in at least 40%, at least 41%, at least 42%, at least 43%, at least 44%, at least 45%, at least 46%, at least 47%, at least 48%, at least 49%, or at least 50% of the subjects already after one administration cycle.

In one preferred embodiment said use of drospirenone induces amenorrhea in at least 30%, at least 31%, at least 32%, at least 33%, at least 34%, at least 35%, at least 36%, at least 37%, at least 38%, at least 39%, preferably in at least 40%, at least 41%, at least 42%, at least 43%, at least 44%, at least 45%, at least 46%, at least 47%, at least 48%, at least 49%, at least 50% of the subjects after six administration cycles.

In another embodiment the amount of vaginal bleeding is reduced after three administration cycles and even more reduced after six administration cycles compared to the amount of vaginal bleeding after administration of a placebo.

Preferred is a reduction of vaginal bleeding after three administration cycles resulting in an amount of about 2.0-5.5 days of vaginal bleeding per cycle (month), preferably of less than about 4.5 days of vaginal bleeding per cycle (month), most preferred of less than about 4.0 days of vaginal bleeding per cycle (month). In an even more preferred embodiment said reduction of vaginal bleeding occurs after two or even after one administration cycle(s).

In a preferred embodiment the amount of vaginal bleeding after six administration cycles results in an amount of about 2.0-5.5 days of vaginal bleeding per cycle (month), preferably of less than about 4.5 days of vaginal bleeding per cycle (month), most preferred of less than about 3.5 days of vaginal bleeding per cycle (month). It is to be understood that the vaginal bleeding may include spotting.

In a further preferred embodiment, said bleeding also includes unscheduled bleeding.

In another embodiment the amount of unscheduled bleeding and/or the intensity of the bleeding is reduced after six administration cycles, preferably after three administration cycles, most preferred after two or one administration cycle(s).

A further benefit of the use according to present invention is that the risk related to contraceptive failure due to pills that were missed in close proximity to the 4-day interval in the previous 24+4 regimen, in which the 4 pills did not contain contraceptive, is avoided.

When used for contraceptive purposes, the composition is administered to a female subject of child-bearing age i.e. from the puberty to the menopause. Women of child-bearing age also include women in perimenopause.

Kit

The present invention also provides a kit, preferably a contraceptive kit, which is particularly suitable for use in the contraceptive and treatment methods as described above.

The present invention thus also relates to a kit, preferably a contraceptive kit, comprising one or more packaging units, wherein each packaging unit comprises at least 28 active daily dosage units.

At least 24 daily dosage units of the kit comprise a first amount of drospirenone, wherein each of these daily dosage units comprise the same amount of drospirenone, and the amount is higher than the amount of drospirenone in the daily dosage units of a second amount of drospirenone.

At least 4 daily dosage units comprise a second amount of drospirenone, wherein each of these daily dosage units comprise the same amount of drospirenone, and the amount of drospirenone is lower than in the daily dosage units comprising a first amount of drospirenone.

In one embodiment of the kit of the present invention the at least 28 active daily dosage units do not comprise an estrogen. Estrogens commonly used for contraceptive purposes include, but are not limited to, estradiol, estradiol sulfamates, estradiol valerate, estradiol benzoate, ethinyl estradiol, estretrol, estrone, estriol, estriol succinate, phytoestrogen and conjugated estrogens.

In a preferred embodiment of the present invention drospirenone is the only contraceptive active ingredient in the at least 28 active daily dosage units.

In one embodiment of the kit of the present invention, said first amount of drospirenone is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.

In a further embodiment of the kit of the present invention, said second amount of drospirenone is from about 2.5 mg to about 3.5 mg, preferably from about 2.6 mg to about 3.2 mg, more preferred about 3.0 mg, most preferred about 2.8 mg.

In a preferred embodiment of the kit of the present invention said first amount of drospirenone is about 4.0 mg and said second amount of drospirenone is about 2.8 mg.

The said kit comprises one or more packaging units. One or more packaging units includes, without being limited to, 1 packaging unit, 2 packaging units, 3 packaging units, 4 packaging units, 5 packaging units and 6 packaging units.

In some embodiments, the kit is characterized in that each packaging unit comprises 28 daily dosage units and no daily dosage unit of a pharmaceutically acceptable placebo. Such a kit is particularly appropriate to perform the method of the present invention which consists in administering "continuously" DRSP without any placebo phase in which no contraceptive is given.

The packaging unit as described above may have one of the conventional forms usually used for oral contraceptives. For example, the packaging unit may be a conventional blister pack comprising the appropriate number of dosage units in a sealed blister pack (e.g. an aluminium blister) with a cardboard, paperboard, foil or plastic backing and enclosed in a suitable cover. Each blister container may be conveniently numbered or marked in order to facilitate compliance. The packaging unit may contain daily dosage units in the order in which they are to be taken.

The kit of the invention may comprise any of the pharmaceutical compositions as disclosed herein after.

The kit of the invention may further comprise other appropriate components such as instructions for use.

Pharmaceutical Compositions

The present invention furthermore relates to a pharmaceutical composition comprising drospirenone for use in a method for treating endometriosis, endometriosis associated pelvic pain (EAPP) and/or dysmenorrhea in a female subject in need thereof as described herein above, or for the use as described herein above, wherein the pharmaceutical composition further comprises one or more pharmaceutically acceptable excipients.

The pharmaceutically acceptable excipients of the composition of the present invention include, but are not limited to, binders, fillers, glidants, lubricants, granulating aids, colorants, anti-caking agents, plasticizers, disintegrants dyes, anti-oxidants, anti-adherents, softeners, preservatives and flavorants that are conventional in the pharmaceutical art.

The suitable binders of the composition of present invention include, but are not limited to, microcrystalline cellulose, hydroxypropyl cellulose, hydroxypropyl methyl cellulose, hydroxyethyl cellulose, methylcellulose, polyvinylpyrrolidone, sodium carboxymethyl cellulose, calcium carboxymethyl cellulose, gums, such as gum tragacanth, acacia gum and gelatin and/or mixtures thereof. Preferably microcrystalline cellulose is used. Binders may be present in an amount from about 0.5% to about 20% by weight, preferably from 1% to 10% by weight, and more preferably from 2-7% by weight, preferably about 5% by weight of the total weight of the composition.

Suitable fillers, also known as diluents, include, but are not limited to, starch, corn starch, pregelatinized starch, modified starch, powdered cellulose, microcrystalline cellulose, silicified cellulose, lactose monohydrate, anhydrous lactose, mannitol, sorbitol, sucrose, fructose, dextrose, dibasic calcium phosphate dihydrate, calcium sulfate trihydrate, calcium sulfate dihydrate, calcium carbonate and/or mixtures thereof. Preferably, anhydrous lactose is used. Fillers may be presents in an amount from about 20% to about 95% by weight, preferably from 30% to 90% by weight, and more preferably from 35% to 80% by weight, even more preferably from 30% to 60%, including about 40%, about 45%, about 50%, about 55% and about 60% by weight of the total weight of the composition.

Lubricants suitable for present invention include, but are not limited to, talc, alkaline earth salts of stearic acid, such as magnesium stearate and calcium stearate, stearic acid, glycerin palmitostearate, stearyl fumarate, zinc stearate, propylene glycol, PEG, vegetable oil, sodium benzoate, sodium lauryl sulfate, magnesium lauryl sulfate, mineral oil polyoxyethylene monostearate and/or mixtures thereof. In preferred embodiments, the lubricant is magnesium stearate. The lubricant may be present in an amount from about 0% to 5% by weight, preferably from about 1% to about 3% (e.g., about 2%) based of the total weight of the composition.

Examples of glidants include silicon dioxide, magnesium trisilicate, powdered cellulose, starch, talc and tribasic calcium phosphate and/or mixtures thereof. In preferred embodiments, the glidant is silicon dioxide.

Pharmaceutically acceptable excipients that may be used to formulate the pharmaceutical composition of the invention are, in particular, described in the Handbook of Pharmaceuticals Excipients, American Pharmaceutical Association (Pharmaceutical Press; 6th Revised edition, 2009).

In some embodiments, the pharmaceutical composition of the invention comprises at least one or more excipients selected from the group of binders, fillers, glidants and lubricants.

In one embodiment of the pharmaceutical composition of present invention said pharmaceutically acceptable excipients are at least one binder and at least one filler, and wherein:
 (i) the amount of drospirenone accounts for 1% to 10% by weight
 (ii) the amount of the at least one binder accounts for 50% to 65% by weight and
 (iii) the amount of the at least one filler accounts for 25% to 35% by weight,
the percentages by weight being related to the total weight of the said pharmaceutical composition.

In a further embodiment of the present invention, the pharmaceutical composition further comprises at least one glidant and at least one lubricant wherein:
 (iv) the amount of the at least one glidant accounts for 0.2% to 6% by weight and
 (v) the amount of the at least one lubricant accounts for 0.2% to 0.6% by weight
the percentages by weight being related to the total weight of the said pharmaceutical composition.

In a preferred embodiment of the pharmaceutical composition of the present invention
 (i) the at least one binder is microcrystalline cellulose,
 (ii) the at least one filler is anhydrous lactose,
 (iii) the at least one glidant is silicon dioxide, and
 (iv) the at least one lubricant is magnesium stearate.

The dosage form according to the invention can also comprise a disintegration agent. Disintegrating agents may be selected from the group consisting of low-substituted hydroxypropyl cellulose, sodium carboxymethyl cellulose, calcium carboxymethyl cellulose, crospovidone, sodium croscarmellose, and/or mixtures thereof. Disintegrating agents may be present in an amount from about 2% to about 50% by weight, preferably from about 5% to about 45% by weight, and more preferably from 10% to 40% by weight of the total weight of the composition.

In some embodiments of the invention DRSP is in the form of multiparticulates. The term "multiparticulate" is defined as encompassing beads, pellets, and any other multiparticulate systems which may be orally administered. In some embodiments of the invention DRSP is dispersed in a matrix. In some embodiments of the invention DRSP in the form of multiparticulates that can be dispersed in a matrix or contained in a capsule. In some embodiments of the invention DRSP is in a matrix that is in the form of pellets. In some embodiments of the invention DRSP is in coated beads.

In one embodiment of the above aspect, the pharmaceutically acceptable matrix is a polymeric matrix, a non-polymeric matrix, or a combination thereof.

The polymeric matrix includes, but is not limited to, hydroxypropylmethyl cellulose; hydroxypropyl cellulose; hydroxyethyl cellulose; hydroxymethyl cellulose; carboxymethyl cellulose; sodium carboxymethyl cellulose; carboxymethylcellulose calcium; polyvinyl pyrrolidone; polyethylene oxide; polyvinyl alcohol; methyl cellulose; ethyl cellulose; propyl cellulose; ethylmethyl cellulose; isopropyl cellulose; ethylpropyl cellulose; butyl cellulose; benzyl cellulose; cellulose esters such as cellulose acetate, cellulose butyrate, cellulose propionate, cellulose butyrate, and cellulose acetate propionate; cellulose cyanoalkyl ethers such as cyanoethyl cellulose, cyanomethyl cellulose, cyanoethylmethyl cellulose, and cyanopropyl cellulose; methacrylic acid-acrylic acid copolymers (e.g., Eudragit RS, Eudragit RL, Eudragit NE, Eudragit RS PO, and Eudragit RL PO); methacrylic acid copolymers; hydroxypropyl methylcellulose phthalate; hydroxypropyl methylcellulose acetate succinate; cellulose acetate phthalate; and mixtures thereof.

The non-polymeric matrix includes, but is not limited to, sugar and sugar alcohols for example sucrose, lactose, fructose, maltose, raffinose, sorbitol, lactitol, mannitol, maltitol, erythritol, threitol, adonitol, arabitol, xylitol, dulcitol, inositol, trehalose, isomalt, 30 inulin, and maltodextrin; cyclodextrin, for example 13-cyclodextrin and hydroxypropyl-13-cyclodextrin; polyethylene glycol; polyethylene glycol esters; medium chain triglycerides; fatty acids; fatty alcohols; waxes; fatty acid esters and mixtures thereof.

In some particularly preferred embodiments, the dosage form of the invention comprises an oral formulation (e.g., tablet or capsule) which is coated to prevent substantial direct contact of DRSP with the oral cavity (e.g. tongue, oral mucosa), oropharyngeal mucosal surface, esophagus or stomach. In some preferred embodiments, the dosage form of the invention comprises an oral formulation which is coated with a film or polymer.

In a preferred embodiment, the pharmaceutical composition according to the invention does not comprise a significant amount of surfactant agent. A significant amount of a surfactant agent may impair the in vitro dissolution profile of DRSP by increasing its initial rate of dissolution. Suitable surfactant agents may be selected from the group consisting of ionic surfactants, such as sodium lauryl sulfate, phospholipids, glycerol monooleate, docusate sodium, or non-ionic surfactant, polyoxyethylene sorbitan fatty acid esters such as polysorbate 80, polyoxyethylene stearates, poloxamer, polyoxyethylene alkyl ethers.

If present, the surfactant is preferably in an amount of from about 0.01 weight percent (wt %) to about 5 wt %, more preferably in an amount of from about 0.1 wt % to about 1 wt %, based on the total weight of the composition. In a most preferred embodiment, the pharmaceutical composition does not contain a surfactant agent.

The pharmaceutical or the contraceptive composition according to the invention may be formulated in a galenic form suitable for oral administration. Such forms include, without being limited to, tablets, caplets, granules, pills, capsules, powders and suspension. In preferred embodiments, the contraceptive composition is formulated in a solid form for oral administration such as tablets, capsules, granules, caplets and pills. Such solid forms are particularly appropriate to be used as daily active dosage unit in the kit according to the present invention.

When the pharmaceutical or the contraceptive composition is formulated in solid forms such as tablets or pills, the said solid forms may be conveniently coated with a suitable film-forming agent such as hydroxypropyl methyl cellulose, hydroxypropyl cellulose or ethyl cellulose, to which a suitable excipient may optionally be added, e.g. a softener such as glycerol, propylene glycol, diethylphthalate or glycerol triacetate, a filler such as sucrose, sorbitol, xylitol, glucose or lactose, or a colorant such as titanium hydroxide, etc.

The pharmaceutical or the contraceptive composition in the form of tablets, pills or granules may be prepared by conventional methods such as direct compression, dry granulation and wet granulation.

The pharmaceutical or the contraceptive composition as described herein may be suitable for administration as the daily active oral form in various administration regimens, preferred administration regimens are described herein above for contraceptive and also for medical purposes referred to herein.

In a particular embodiment, said composition is suitable for administration to a female subject in need thereof as the daily active oral form in a regimen comprising the administration of an active oral form for 28 consecutive days, wherein at least 24 daily dosage units of the kit comprise a first amount of drospirenone, wherein each of these daily dosage units comprise the same amount of drospirenone, and the amount is higher than the amount of drospirenone in the daily dosage units of a second amount of drospirenone. At least 4 daily dosage units comprise a second amount of drospirenone, wherein each of these daily dosage units comprise the same amount of drospirenone, and the amount of drospirenone is lower than in the daily dosage units comprising a first amount of drospirenone.

It is contemplated that any features described herein can optionally be combined with any of the embodiments of any medical or contraceptive use, composition, kit, contraceptive methods, methods of treatment, or method of manufacturing of the invention; and any embodiment discussed in this specification can be implemented with respect to any of these. It will be understood that particular embodiments described herein are shown by way of illustration and not as limitations of the invention.

All publications and patent applications are herein incorporated by reference to the same extent as if each individual publication or patent application was specifically and individually indicated to be incorporated by reference.

The use of the word "a" or "an" may mean "one," but it is also consistent with the meaning of "one or more," "at least one," and "one or more than one". The use of the term "another" may also refer to one or more. The use of the term "or" in the claims is used to mean "and/or" unless explicitly indicated to refer to alternatives only or the alternatives are mutually exclusive.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The term "comprises" also encompasses and expressly discloses the terms "consists of" and "consists essentially of". As used herein, the phrase "consisting essentially of" limits the scope of a claim to the specified materials or steps and those that do not materially affect the basic and novel characteristic(s) of the claimed invention. As used herein, the phrase "consisting of" excludes any element, step, or ingredient not specified in the claim except for, e.g., impurities ordinarily associated with the element or limitation.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "around", "approximately" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by ±1, 2, 3, 4, 5, 6, 7, 8, 9, or 10%. Accordingly, the term "about" may mean the indicated value ±5% of its value, preferably the indicated value ±2% of its value, most preferably the term "about" means exactly the indicated value (±0%).

The following examples serve to illustrate the present invention and should not be construed as limiting the scope thereof.

EXAMPLES

Example 1: Open-Label, Randomized Study to Evaluate the Influence on the Hormonal and Ovarian Activity of Two Different Dosages of Drospirenone (either 4.0 mg for 24 Days or 2.8 mg Daily for 28 Days) Over Two Treatment Cycles in 50 Healthy, Young Females Main Objective of the Trial:

The ovulation inhibition potential reflected by the hormonal and ovarian activity of two different dosages and intake regimens of drospirenone (DRSP) was assessed in 50 healthy women. Subjects were assigned to one of two treatment regimens after stratification for the ovulation day in the precycle.

Recruitment Details:

Healthy premenopausal females of any ethnic origin (18 to 35 years of age), inclusive; (smokers not older than 30 years; smokers ≤30 years up to 10 cigarettes daily), BMI of 18-30 kg/m2, history of regular cycles, blood pressure after resting for 5 minutes between 90-140 mmHg (systolic) and 50-90 mmHg (diastolic), etc.

Arms:

Fifty subjects were allocated either to Treatment 1 (4.0 mg DRSP for 24 days followed by 4 placebo tablets) or Treatment 2 (2.8 mg DRSP for 28 days) over two treatment cycles.

Arm Description:
  Arm type Experimental
  a) Treatment 1
    Investigational medicinal product name: Drospirenone 4.0 mg coated tablets
    Pharmaceutical forms: Tablet
    Routes of administration: Oral use
    Dosage and administration details: 28 coated tablets, oral, once daily, 24 contain 4.0 mg DRSP and 4 placebo
    Excipients 4 mg DRSP tablets (white): anhydrous lactose, microcrystalline cellulose, colloidal silicon dioxide, magnesium stearate, opadry II white
    Excipients placebo tablets (green): anhydrous lactose, microcrystalline cellulose, colloidal silicon dioxide, magnesium stearate, opadry II green.
  b) Treatment 2
    Investigational medicinal product name: Drospirenone 2.8 mg coated tablets
    Pharmaceutical forms Tablet
    Routes of administration: Oral use
    Dosage and administration details: 28 coated tablets, oral, once daily
    Excipients 2.8 mg DRSP tablets (pink): anhydrous lactose, microcrystalline cellulose, colloidal silicon dioxide, magnesium stearate, opadry II pink This Phase II study evaluated two different dosing regimens for two cycles: a continuous regimen with Drospirenone (DRSP) 2.8 mg dose for 28 days compared with the currently approved 24+4 dosing regimen with DRSP 4.0 mg (Slynd™).

1.) Summary of Results: Ovulation Inhibition Potential

The efficacy assessments in this clinical trial were Hoogland score (composite parameter of follicle size, estradiol and progesterone levels) as well as LH and FSH levels, endometrial thickness and bleeding pattern. The primary endpoint was the Hoogland Score (FAS). One DRSP 2.8 mg subject had a Hoogland Score of "5" in Cycle 1, which may possibly be explained by concomitant diarrhoea. Two DRSP 4.0 mg subjects had Hoogland Scores of "6" (one in Cycle 1, another in Cycle 2). The Hoogland Score of "6" in Cycle 2 may possibly be explained by concomitant vomiting. However, the progesterone levels (maxima 5.34 nmol/L, 5.34 nmol/L and 6.17 nmol/L, respectively) were not persistent and below normal luteal phase levels.

Overall, the suppression of ovarian activity was more pronounced with the DRSP 4.0 mg 24/4 regimen than with the DRSP 2.8 mg 28/0 regimen.

The logistic regression model with the binary response of Hoogland Score ≤4 and >4 that was foreseen in the protocol, proved to be inappropriate for the data of Cycle 2. Therefore, an additional logistic regression model with the binary response of Hoogland Score ≤3 and >3 was calculated.

In Cycle 1, the proportion of subjects with Hoogland Score ≤3 was eight (32.0%) in the DRSP 2.8 mg group and 10 (40.0%) in the DRSP 4.0 mg group. In Cycle 2, the proportion of subjects with Hoogland Score ≤3 was seven (28.0%) in the DRSP 2.8 mg group and 11 (44.0%) in the DRSP 4.0 mg group. Thus, the difference in favour of the high-dose regimen was more pronounced in Cycle 2.

The estimated odds ratio [95% CI] for having a Hoogland Score below or equal 3 with the DRSP 4.0 mg 24/4 regimen versus the DRSP 2.8 mg 28/0 regimen was 1.4167 [0.4449; 4.6240] in Cycle 1 and 2.0202 [0.6317; 6.8038] in Cycle 2. The CIs indicated that these results were not statistically significant. The Chi-square test showed that treatment group had no significant effect on Hoogland Score (p=0.5563, Cycle 1 and p=0.2417, Cycle 2).

In the course of the two treatment cycles, the follicles in the DRSP 4.0 mg group tended to be smaller than in the DRSP 2.8 mg group. This difference was more pronounced in Cycle 1 than in Cycle 2. In the DRSP 2.8 mg group, the mean (SD) maximum follicular diameter was 17.81 (6.19) mm in Cycle 1 and 19.03 (6.57) mm in Cycle 2. In the DRSP 4.0 mg group, the mean (SD) was 14.89 (4.45) mm in Cycle 1 and 16.66 (6.64) mm in Cycle 2. Despite the 4-day hormonal break in the DRSP 4.0 mg group, the maximum follicle size did not increase markedly and remained below the maximum follicle size in the DRSP 2.8 mg group in the beginning of Cycle 2.

The proportion of subjects having three consecutive measurements of a follicular diameter ≥15 mm was lower with the DRSP 4.0 mg 24/4 regimen (28.0% in Cycle 1, 36.0% in Cycle 2) than with the DRSP 2.8 mg 28/0 regimen (52.0% in Cycle 1, 60.0% in Cycle 2). The progesterone levels were similar in the two groups. With the high-dose formulation, the mean (SD) maximum levels per cycle were 3.89 (1.10) nmol/L in Cycle 1 and 3.74 (1.01) nmol/L in Cycle 2. With the low-dose formulation the mean (SD) maximum levels per cycle were 3.54 (1.06) nmol/L in Cycle 1 and 3.48 (1.11) nmol/L in Cycle 2.

The majority of the subjects had low estradiol levels, but some subjects (especially in the low-dose group) had elevated estradiol levels. On the whole, the serum estradiol levels in the DRSP 4.0 mg group were lower than in the DRSP 2.8 mg group. With the DRSP 4.0 mg regimen, the median maximum values per cycle were 287.0 pmol/L in Cycle 1 and 309.0 pmol/L in Cycle 2, as opposed to 450.0 pmol/L in Cycle 1 and 377.0 pmol/L in Cycle 2 with the DRSP 2.8 mg regimen.

Activity of follicles does not only increase with their size but also with the concomitant serum estradiol levels. Therefore, in a further analysis, follicular size and serum estradiol levels were combined: Among the subjects with follicular size >13 mm, the proportion of subjects with E2 levels 275 pmol/L or above was lower in the DRSP 4.0 mg group (Cycle 1: eight [32.0%] subjects, Cycle 2:11 [44.0%] subjects) than in the DRSP 2.8 mg group (Cycle 1:13 [52.0%], Cycle 2:16 [64.0%] subjects).

With respect to endometrial thickness, there were no relevant differences between treatment groups. In Cycle 1 the mean (SD) maximum endometrial thickness per cycle was higher in the DRSP 2.8 mg group (6.50 [1.44] mm) than in the DRSP 4.0 mg group (6.33 [1.23] mm). In Cycle 2, by contrast, the mean (SD) maximum endometrial thickness per cycle was lower in the DRSP 2.8 mg group (6.57 [1.70] mm) than in the DRSP 4.0 mg group (6.60 [1.38] mm).

In both treatment groups, the serum LH levels were clearly below the ovulatory phase threshold value of 14.0 U/L throughout both treatment cycles. Mean (SD) serum LH levels were higher in the DRSP 2.8 mg group (visit maximum 7.67 (2.87) U/L observed on Day 6/Cycle 1) than in the DRSP 4.0 mg group (visit maximum 6.30 (1.78) U/L on Day 3/Cycle 1).

The mean (SD) serum FSH levels ranged from 4.67 (1.75) U/L (DRSP 4.0 mg group, Day 9 in Cycle 2) to 6.71 (2.43) U/L (DRSP 2.8 mg group, Day 3 in Cycle 1). Overall, there were no relevant differences in FSH levels between treatment groups.

In summary, the subjects on the DRSP 4.0 mg 24/4 regimen tended to have smaller follicles, and lower levels of estradiol and LH than the subjects on the DRSP 2.8 mg 28/0 regimen. With respect to endometrial thickness, progesterone and FSH levels, no noticeable differences between the two regimens were observed.

2.) Summary of Results: Induction of Amenorrhea

The proportion of amenorrhoeic subjects in both cycles was higher in the DRSP 2.8 mg continuous arm: seven (28.0%) subjects compared to three (12.0%) DRSP 4.0 mg group subjects. In Cycle 1, twelve (48.0%) DRSP 2.8 mg subjects and six (24.0%) DRSP 4.0 mg subjects reported amenorrhea. In Cycle 2, nine (36.0%) DRSP 2.8 mg subjects and four (16.0%) DRSP 4.0 mg subjects were amenorrhoeic. In summary, the proportion of amenorrhoeic subjects in the DRSP 2.8 mg group was higher in comparison with the DRSP 4.0 mg group in both treatment cycles (see table 1 and FIG. 1).

TABLE 1

Number of Subjects with Amenorrhea by Cycle (FAS)
Statistic DRSP 2.8 mg continuous (N = 25)
DRSP 4.0 mg (24 + 4) (N = 25)

| | Statistics | DRSP 2.8 mg continuous (N = 25) | DRSP 4.0 mg (24 + 4) (N = 25) |
|---|---|---|---|
| Cycle 1 | n (%) | 12 (48.0%) | 6 (24.0%) |
| Cycle 2 | n (%) | 9 (36.0%) | 4 (16.0%) |
| Both cycles | n (%) | 7 (28.0%) | 3 (12.0%) |

Additionally, it was observed that the subjects on the DRSP 4.0 mg 24/4 regimen tended to have lower mean and median serum estradiol levels per subject than the subjects on the DRSP 2.8 mg 28/0 regimen. However, the difference between the groups was not statistically significant.

TABLE 2

Serum levels of estradiol (pmol/L) DRSP 2.8 mg
continuous (N = 25) DRSP 4.0 mg (24 + 4) (N = 25)

| | Statistics | Mean serum levels estradiol (pmol/L) DRSP 2.8 mg continuous (N = 25) | Mean Serum levels estradiol (pmol/L) DRSP 4.0 mg (24 + 4) (N = 25) |
|---|---|---|---|
| Cycle 1 | Mean (SD) | 284.53 (261.66) | 213.91 (152.84) |
| | Median | 192.67 | 173.22 |
| | Min/Max | 91.6/1371.9 | 49.7/737.3 |
| Cycle 2 | Mean (SD) | 276.08 (173.95) | 245.51 (177.73) |
| | Median | 222.78 | 178.22 |
| | Min/Max | 105.9/661.0 | 94.2/918.6 |
| Day 3 Cycle 1 | Mean (SD) | 168.1 (107.1) | 162.6 |
| | Median | 149.0 | 151.0 |
| | Min/Max | 71/621 | 37/373 |

The thus far unpublished results of this trial show that a higher proportion of patients in the 2.8 mg regimen presented amenorrhea, as depicted in FIG. 1. Furthermore, the data shows that the continuous treatment has no impact in decreasing the estradiol levels below treatment initiation.

Example 2: Multicentre, Phase III, Double-Blind, Randomised Clinical Trial to Assess the Efficacy and Safety of LPRI-CF113 in the Treatment of Endometriosis Versus Placebo after 3 Medication Cycles Followed by 3 Open-Label Medication Cycles The information described herein is an extract of the study protocol of a Phase III clinical trial, namely a multicentre, double-blind, randomised clinical trial to assess the efficacy and safety of LPRI-CF113 in the treatment of endometriosis versus placebo after 3 medication cycles followed by 3 open-label medication cycles.

Materials and Methods

Primary Objective and Endpoint

The primary objective is to demonstrate the efficacy of LPRI-CF113 in the management of Endometriosis associated pelvic pain (EAPP) as assessed on a numeric rating scale (NRS), after 3 medication cycles.

Secondary Objectives and Endpoints
To assess the efficacy of LPRI-CF113 versus placebo in terms of response to treatment.

Key Secondary Endpoints:
1. Changes after 1, 3 and 6 medication cycle(s) compared to baseline in dysmenorrhea (assessed via NRS pain score).
2. Changes after 1, 3 and 6 medication cycle(s) compared to baseline in non-menstrual pelvic pain (NMPP, assessed via NRS pain score).
3. Changes after 1, 3 and 6 medication cycle(s) compared to baseline in rescue medication intake.
4. Changes after 1 and 6 medication cycle(s) compared to baseline in EAPP (assessed via an NRS pain score).

Other Secondary Efficacy Endpoints:
1. Changes after 1, 3 and 6 medication cycle(s) compared to baseline in dyspareunia
2. Number and percentage of subjects with amenorrhoea
3. Vaginal bleeding pattern Secondary Safety Endpoints:
1. Adverse events.
2. Mean absolute and relative changes in laboratory values.
3. Vital signs Overall Design
This is a multi-centre clinical trial in postmenarcheal and premenopausal female subjects ≥15 and ≤45 years of age with a histologically confirmed diagnosis of endometriosis and with an EAPP score ≥3 during the last 3 months before trial entry. The clinical trial consists of a screening period (up to 100 days), a treatment period consisting of 3 placebo-controlled, double-blind medication cycles and an open-label extension period during which all subjects will receive active treatment with LPRI-CF113 for 3 cycles.

At Visit 1a, informed consent/assent will be obtained, and the screening procedures will be performed. Additionally, an e-diary will be dispensed and the subjects will be instructed how to complete it. A wash-out of hormonal contraceptives or hormonal therapies for the treatment of endometriosis of 1 menstrual cycle during the screening period will be requested at Visit 1a, if applicable. The subject's next menstrual cycle after the wash-out cycle will be considered as baseline cycle. For subjects not requiring a wash-out cycle, the menstrual cycle before IP start will be considered as baseline cycle. A baseline cycle length between 21 and 35 days will be acceptable. Visit 1b should be scheduled at least 29 days after V1a and before the anticipated last day of the baseline cycle.

At Visit 1b, after eligibility is confirmed, the subjects will be randomised to LPRI-CF113 or placebo and they will be provided with the Investigational Product (IP). The first intake of IP will be on the first day of the next menstrual bleeding after Visit 1b. If the menstrual bleeding starts in the evening, and the subject prefers to take the IP in the morning, then she may begin the first IP intake the next day [Day 2 of the menstrual bleeding]. Afterwards, the subjects will come to the site at Visit 2 and Visit 3 on Day 20 (+6) of the 1st and 3rd medication cycle. The end-of treatment visit (Visit 4/early discontinuation visit [EDV]) will be performed up to 3 days after the last IP intake of medication cycle 6.

In addition, site staff will call the subjects regularly, on Day 1 (+2) of each medication cycle, to collect basic information, especially on any AE which might have occurred and to review e-diary compliance. Additionally, a follow-up visit (phone call or on-site) will be performed 10 (+4) days after the last IP intake of the 6th medication cycle.

Subjects are allowed to take nonsteroidal anti-inflammatory drugs (NSAIDs) as rescue medication during the trial as needed. The subject should take the same NSAID as rescue medication (including strength) throughout the trial. They will be allowed to either continue with one NSAID taken before trial entry, to switch to another NSAID or if medically feasible, to start using a selected NSAID (if no NSAID was used before) at Visit 1a. However, switching to another NSAID after Visit 1a and prophylactic NSAID intake will not be allowed and no new pain medication should be started during the trial.

Study Population

Number of Subjects (Planned):
Screened: Approximately 236 subjects. Screening will continue until a sufficient number of subjects have been allocated to treatment.
Randomised: At least 212 subjects with a randomisation ratio 3:1
Postmenarcheal and premenopausal female subjects ≥15 and ≤45 years of age with a histologically confirmed diagnosis of endometriosis and with an EAPP score ≥3 on an NRS for at least 3 months, who will be randomised to receive either LPRI-CF113 (4 mg/day for 24 days followed by 2.8 mg/day for 4 days per 28-day cycle) or placebo. Subjects who took the respective IP at least once and have at least one outcome measurement after baseline (full-analysis set [FAS]) will be analysed.

Treatments
Identity of Investigational Product(s)
Test product Name(s): LPRI-CF113
Dosage form: Film-coated tablets for oral administration
Active ingredient: Drospirenone (DRSP)
Strength/concentration: 4 mg/2.8 mg DRSP (24/4)
Excipients 4 mg DRSP tablets (white): anhydrous lactose, microcrystalline cellulose, colloidal silicon dioxide, magnesium stearate, opadry II 85F18422 white
Excipients 2.8 mg DRSP tablets (pink): anhydrous lactose, microcrystalline cellulose, colloidal silicon dioxide, magnesium stearate, opadry II pink
Presentation: 24 white tablets, followed by 4 pink tablets Reference Product (Matching Placebo):
Name(s): LPRI-CF113 placebo
Dosage form: Film-coated tablets for oral administration
Active ingredient: Not applicable
Strength/concentration: Not applicable
Excipients placebo tablets (white) Anhydrous lactose, microcrystalline cellulose, colloidal silicon dioxide, magnesium stearate, opadry II 85F18422 white
Excipients placebo tablets (pink) Anhydrous lactose, microcrystalline cellulose, colloidal silicon dioxide, magnesium stearate, opadry II pink
Presentation: 24 white tablets, followed by 4 pink tablets Selection and Timing of Dose for Each Subject
Each subject will take LPRI-CF113 or matching placebo during the first 3 medication cycles of trial participation. Afterwards, each subject will receive active treatment with LPRI-CF113 for additional 3 medication cycles. Medication packages for 3 medication cycles plus one cycle reserve will be provided at Visit 1b (LPRI-CF113/placebo) and Visit 3 (LPRI-CF113). Detailed instructions on the use of the medication will be provided by the investigator and by the information given within the subject information sheet.

The subject has to take the first tablet on the day of her next menstrual bleeding after Visit 1b. If the menstrual bleeding starts in the evening, and the subject prefers to take her pill in the morning, then she may begin the first IP intake the next day (Day 2 of the menstrual bleeding). From Day 1 to Day 28 of the medication cycle, one tablet should be pushed out of the blister pack and swallowed whole once daily. Tablets must be taken every day at about the same time so that the interval between 2 tablet intakes is always 24 hours. They should be taken in the order shown on the blister. The first tablet from the next blister is to be taken directly on the next day after the last tablet of the previous blister was taken, i.e. without any pill-free interval, and regardless of whether bleeding occurred, has stopped or is still continuing. Each medication cycle will begin on the same day of the week. Administration of the IPs is to be continued in this manner for 6 medication cycles in total.

If any bleeding or spotting occurs, the intake of the IPs is to be continued. In case of unusually heavy bleeding, the subject should consult the investigator for diagnostic clarification. The administration of hormonal preparations to treat bleeding is not allowed during the course of the trial as this might influence the results.

If the subject missed one dose of IP, the missed tablet should be taken as soon as it is remembered, even if this means taking 2 tablets at the same time. The next tablet should be taken at the usual time. If vomiting or diarrhoea occurs within 3 to 4 hours after tablet intake, a new (replacement) tablet should be taken as soon as possible from the reserve blister. The new (replacement) tablet should be taken within 12 hours of the usual time of tablet-taking if possible. In case of more than one missed dose, the last missed tablet (only one tablet) should be taken. Other missed tablet(s) should remain in the blister.

REFERENCE LIST

Edelman, A, Micks, E, Gallo, M F, Jensen, J T and Grimes, D A (2014). "Continuous or extended cycle vs. cyclic use of combined hormonal contraceptives for contraception." Cochrane Database Syst Rev 2014(7): Cd004695.

Casper, R F (2017). "Progestin-only pills may be a better first-line treatment for endometriosis than combined estrogen-progestin contraceptive pills." Fertil Steril 107 (3): 533-536.

Schindler, A E (2011). "Dienogest in long-term treatment of endometriosis." Int J Womens Health 3:175-184.

Taylor, H S, Giudice, L C, Lessey, B A, Abrao, M S, Kotarski, J, Archer, D F, Diamond, M P, Surrey, E, Johnson, N P, Watts, N B, Gallagher, J C, Simon, J A, Carr, B R, Dmowski, W P, Leyland, N, Rowan, J P, Duan, W R, Ng, J, Schwefel, B, Thomas, J W, Jain, R I and Chwalisz, K (2017). "Treatment of Endometriosis-Associated Pain with Elagolix, an Oral GnRH Antagonist." N Engl J Med 377(1): 28-40.

Vercellini, P, Viganò, P, Somigliana, E and Fedele, L (2014). "Endometriosis: pathogenesis and treatment." Nature Reviews Endocrinology 10(5): 261-275.

Norwitz E. R and Schorge J. O. Obstetrics and Gynecology at a Glance Fourth Edition (2013). Wiley-Blacwell.

Zondervan, K T, Becker, C M and Missmer, S A (2020). "Endometriosis." New England Journal of Medicine 382 (13): 1244-1256.

Paolo Vercellini, M. D., Laura Buggio, M. D., Maria Pina Frattaruolo, M. D., Alessandro Borghi, M. D., Dhouha Dridi, M. D., Edgardo Somigliana, M. D. (2018) "Medical treatment of endometriosis related pain" Best Practice & Research Clinical Obstetrics & Gynaecology. 51, 68-91.

Vercellini, P, Bracco, B, Mosconi, P, Roberto, A, Alberico, D, Dhouha, D and Somigliana, E (2016). "Norethindrone acetate or dienogest for the treatment of symptomatic endometriosis: a before and after study." Fertil Steril 105(3): 734-743.e733.

Côté, I, Jacobs, P and Cumming, D (2002). "Work loss associated with increased menstrual loss in the United States." Obstet Gynecol 100(4): 683-687.

Rose, J G, Chrisler, J C and Couture, S (2008). "Young women's attitudes toward continuous use of oral contraceptives: the effect of priming positive attitudes toward menstruation on women's willingness to suppress menstruation." Health Care Women Int 29(7): 688-701.

Loudon, N B, Foxwell, M, Potts, D M, Guild, A L and Short, R V (1977). "Acceptability of an oral contraceptive that reduces the frequency of menstruation: the tri-cycle pill regimen." Br Med J 2(6085): 487-490.

Rutter, W, Knight, C, Vizzard, J, Mira, M and Abraham, S (1988). "Women's attitudes to withdrawal bleeding and their knowledge and beliefs about the oral contraceptive pill." Med J Aust 149(8): 417-419.

den Tonkelaar, I and Oddens, B J (1999). "Preferred frequency and characteristics of menstrual bleeding in relation to reproductive status, oral contraceptive use, and hormone replacement therapy use." Contraception 59(6): 357-362.

Glasier, A F, Smith, K B, van der Spuy, Z M, Ho, P C, Cheng, L, Dada, K, Wellings, K and Baird, D T (2003). "Amenorrhea associated with contraception—an international study on acceptability." Contraception 67(1): 1-8.

Wiegratz, I, Hommel, H H, Zimmermann, T and Kuhl, H (2004). "Attitude of German women and gynecologists towards long-cycle treatment with oral contraceptives." Contraception 69(1): 37-42.

Szarewski, A, von Stenglin, A and Rybowski, S (2012). "Women's attitudes towards monthly bleeding: results of a global population-based survey." Eur J Contracept Reprod Health Care 17(4): 270-283.

Palacios, S, Colli, E and Regidor, P A (2019). "Multicenter, phase III trials on the contraceptive efficacy, tolerability and safety of a new drospirenone-only pill." Acta Obstet Gynecol Scand 98(12): 1549-1557.

Kimble, Thomas, et al (2020). A 1-year prospective, open-label, single-arm, multicenter, phase 3 trial of the contraceptive efficacy and safety of the oral progestin-only pill drospirenone 4 mg using a 24/4-day regimen. Contraception: X, 2020, vol. 2, p. 100020.

Gerlinger et al. (2010). "Defining a minimal clinically important difference for endometriosis-associated pelvic pain measured on a visual analog scale: analyses of two placebo-controlled, randomized trials". Health and Quality of Life Outcomes 2010, 8:138.

H. Breivik et al. (2008) "Assessment of pain", BJA: British Journal of Anaesthesia, Volume 101, Issue 1, July 2008, Pages 17-24, https://doi.org/10.1093/bja/aen103

EXEMPLARY EMBODIMENTS OF THE INVENTION

1. Drospirenone for use in a method for treating endometriosis, endometriosis associated pelvic pain (EAPP) and/or dysmenorrhea in a female subject, comprising administering drospirenone in a biphasic regimen to said subject, wherein during the first phase a daily amount of drospirenone is administered and in the second phase a lower daily amount of drospirenone is administered.

2. Drospirenone for use in a method for treating endometriosis and/or endometriosis associated pelvic pain (EAPP) and/or dysmenorrhea of embodiment 1, wherein said daily amount of drospirenone is administered once daily from day 1 to day 24 and subsequently said lower daily amount of drospirenone is administered once daily on days 25 to 28.
3. Drospirenone for use in a method for treating endometriosis and/or endometriosis associated pelvic pain (EAPP) and/or dysmenorrhea of embodiments 1 or 2, wherein the daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.
4. Drospirenone for use in a method for treating endometriosis, endometriosis associated pelvic pain (EAPP) and/or dysmenorrhea of embodiments 1 to 3, wherein the lower daily amount of drospirenone administered from day 25 to 28 is from about 2.5 mg to 3.5 mg, preferably from about 2.6 mg to 3.2 mg, more preferred about 3.0 mg, most preferred about 2.8 mg of drospirenone.
5. Drospirenone for use in a method for treating endometriosis, endometriosis associated pelvic pain (EAPP) and/or dysmenorrhea of embodiments 1 to 4, wherein the daily amount of drospirenone administered from day 1 to day 24 is 4.0 mg and the lower daily amount of drospirenone administered from day 25 to 28 is 2.8 mg.
6. Drospirenone for use in a method for treating endometriosis, endometriosis associated pelvic pain (EAPP) and/or dysmenorrhea of embodiments 1 to 5, wherein said treatment also provides contraception.
7. Use of Drospirenone as a contraceptive, comprising administering drospirenone in a biphasic regimen to a female subject in need thereof, wherein during the first phase a daily amount of drospirenone is administered to said subject and in the second phase a lower daily amount of drospirenone is administered to said subject.
8. Use of Drospirenone according to embodiment 7, wherein said administering of drospirenone induces amenorrhea.
9. Use of Drospirenone according to embodiments 7 or 8, wherein said daily amount of drospirenone is administered once daily from day 1 to day 24 and subsequently a lower daily amount of drospirenone is administered once daily on days 25 to 28.
10. Use of Drospirenone according to any one of embodiments 7 to 9, wherein the daily amount of drospirenone administered from day 1 to day 24 is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.
11. Use of Drospirenone according to any one of embodiments 7 to 10, wherein the lower daily amount of drospirenone administered from day 25 to 28 is from about 2.5 mg to about 3.5 mg, preferably from about 2.6 mg to about 3.2 mg, more preferred about 3.0 mg, most preferred about 2.8 mg of drospirenone.
12. Drospirenone for use in a method of any one of embodiments 1 to 6 and the use of drospirenone according to any one of embodiments 7 to 11, wherein the administration route is selected from oral, transdermal or transmucosal administration, preferably the administration route is oral.
13. A kit, preferably a contraceptive kit, comprising one or more packaging units, wherein each packaging unit comprises at least 28 active daily dosage units, wherein
   a) at least 24 daily dosage units comprise a first amount of drospirenone, wherein each of these daily dosage units comprise the same amount of drospirenone, and the amount is higher than the amount of drospirenone in the daily dosage units of a second amount of drospirenone; and
   b) at least 4 daily dosage units comprise the second amount of drospirenone, wherein each of these daily dosage units comprise the same amount of drospirenone, and the amount of drospirenone is lower than in the daily dosage units comprising the first amount of drospirenone.
14. The kit according to embodiment 13, wherein the at least 28 active daily dosage units do not comprise an estrogen.
15. The kit according to embodiments 13 or 14, wherein drospirenone is the only contraceptive active ingredient in the at least 28 active daily dosage units.
16. The kit according to any one of embodiments 13 to 15, wherein said first amount of drospirenone is from about 2.0 mg to 6.0 mg, preferably from about 3.0 mg to 5.0 mg, more preferred from about 3.5 mg to 4.5 mg, even more preferred from about 3.8 mg to 4.2 mg, most preferred about 4.0 mg of drospirenone.
17. The kit according to any one of embodiments 13 to 16, wherein in the said second amount of drospirenone is from about 2.5 mg to about 3.5 mg, preferably from about 2.6 mg to about 3.2 mg, more preferred about 3.0 mg, most preferred about 2.8 mg drospirenone.
18. A pharmaceutical composition comprising drospirenone for use in a method for treating Endometriosis, Endometriosis associated pelvic pain (EAPP) and/or Dysmenorrhea in a female subject in need thereof according to any one of embodiments 1 to 6, wherein the pharmaceutical composition further comprises one or more pharmaceutically acceptable excipients.
19. Use of drospirenone according to any one of embodiments 7 to 12 in a contraceptive composition, wherein the composition further comprises one or more pharmaceutically acceptable excipients.
20. The pharmaceutical composition according to embodiment 18, or the contraceptive composition as defined in embodiment 19, wherein the said pharmaceutically acceptable excipients are at least one binder and at least one filler, and wherein:
   (i) the amount of drospirenone accounts for 1% to 10% by weight
   (ii) the amount of the at least one binder accounts for 50% to 65% by weight and
   (iii) the amount of the at least one filler accounts for 25% to 35% by weight, the percentages by weight being related to the total weight of the said pharmaceutical composition.
21. The pharmaceutical composition of embodiment 20, further comprising at least one glidant and at least one lubricant wherein:
   (iv) the amount of the at least one glidant accounts for 0.2% to 6% by weight and (v) the amount of the at least one lubricant accounts for 0.2% to 0.6% by weight the percentages by weight being related to the total weight of the said pharmaceutical composition.

22. The pharmaceutical or the contraceptive composition of embodiment 21, wherein:
(i) the at least one binder is microcrystalline cellulose
(ii) the at least one filler is anhydrous lactose
(iii) the at least one glidant is silicon dioxide and
(iv) the at least one lubricant is magnesium stearate.

23. Use of drospirenone as a contraceptive, according to any one of embodiments 4 to 7 in a pharmaceutical composition as defined in any one of embodiments 12 to 14.

The invention claimed is:

1. A method of providing contraception to a female subject, comprising orally administering drospirenone in a biphasic regimen to said subject, wherein during a first phase a daily amount of drospirenone of from about 3.0 mg to about 6.0 mg is orally administered and during a second phase a lower daily amount of drospirenone of from about 2.5 mg to about 3.5 mg is orally administered.

2. The method of claim 1, wherein the daily amount of drospirenone is orally administered once daily from day 1 to day 24 and subsequently, the lower daily amount of drospirenone is administered orally once daily from day 25 to 28.

3. The method of claim 2, wherein the daily amount of drospirenone orally administered from day 1 to day 24 is from about 3.0 mg to about 5.0 mg of drospirenone.

4. The method of claim 2, wherein the daily amount of drospirenone orally administered from day 1 to day 24 is from about 3.5 mg to about 4.5 mg of drospirenone.

5. The method of claim 2, wherein the daily amount of drospirenone orally administered from day 1 to day 24 is from about 3.8 mg to about 4.2 mg of drospirenone.

6. The method of claim 2, wherein the daily amount of drospirenone orally administered from day 1 to day 24 is about 4.0 mg of drospirenone.

7. The method of claim 2, wherein the lower daily amount of drospirenone orally administered from day 25 to 28 is from about 2.6 mg to about 3.2 mg of drospirenone.

8. The method of claim 2, wherein the lower daily amount of drospirenone orally administered from day 25 to 28 is about 2.8 mg of drospirenone.

9. The method of claim 1, wherein said orally administering of drospirenone induces amenorrhea.

10. The method of claim 1, wherein the drospirenone is orally administered in a pharmaceutical composition comprising at least two pharmaceutically acceptable excipients, wherein the at least two pharmaceutically acceptable excipients are at least one binder and at least one filler, and wherein:
(iii) the amount of drospirenone accounts for 1% to 10% by weight,
(ii) the amount of the at least one binder accounts for 50% to 65% by weight, and
(iii) the amount of the at least one filler accounts for 25% to 35% by weight,
wherein the percentages by weight are determined based upon the total weight of the pharmaceutical composition.

11. The method of claim 2, wherein the drospirenone is orally administered in a pharmaceutical composition comprising at least two pharmaceutically acceptable excipients, wherein the at least two pharmaceutically acceptable excipients are at least one binder and at least one filler, and wherein:
(i) the amount of drospirenone accounts for 1% to 10% by weight,
(ii) the amount of the at least one binder accounts for 50% to 65% by weight, and
(iii) the amount of the at least one filler accounts for 25% to 35% by weight,
wherein the percentages by weight are determined based upon the total weight of the pharmaceutical composition.

12. The method of claim 10, wherein the pharmaceutical composition comprises at least one glidant and at least one lubricant wherein:
(i) the amount of the at least one glidant accounts for 0.2% to 6% by weight and
(ii) the amount of the at least one lubricant accounts for 0.2% to 0.6% by weight,
wherein the percentages by weight are determined based upon the total weight of the pharmaceutical composition.

13. The method of claim 12, wherein:
(i) the at least one binder is microcrystalline cellulose
(ii) the at least one filler is anhydrous lactose
(iii) the at least one glidant is silicon dioxide, and
(iv) the at least one lubricant is magnesium stearate.

* * * * *